United States Patent [19]

Soria et al.

[11] Patent Number: 5,238,569
[45] Date of Patent: Aug. 24, 1993

[54] FILTER MEMBRANE AND METHOD OF MANUFACTURE

[75] Inventors: Raymond Soria, Bazet; Corinne Defalque, Tarbes; Jacques Gillot, Laloubere, all of France

[73] Assignee: Societe des Ceramiques Techniques, Bazet, France

[21] Appl. No.: 917,983

[22] Filed: Jul. 24, 1992

[30] Foreign Application Priority Data

Jul. 25, 1991 [FR] France ................. 91 09432

[51] Int. Cl.$^5$ ............................................. B01D 71/76
[52] U.S. Cl. ................... 210/500.27; 264/45.1; 264/DIG. 48; 264/DIG. 62; 96/12; 96/13
[58] Field of Search ............... 55/16, 158; 210/500.27, 210/500.21; 264/41, 45.1, DIG. 48, DIG. 62

[56] References Cited

U.S. PATENT DOCUMENTS

| | | | |
|---|---|---|---|
| 4,710,204 | 12/1987 | Kraus et al. | 55/16 |
| 4,749,489 | 6/1988 | Allen et al. | |
| 4,946,592 | 8/1990 | Galaj et al. | |
| 5,059,366 | 10/1991 | Galaj et al. | |
| 5,066,398 | 11/1991 | Soria et al. | 210/500.27 |

FOREIGN PATENT DOCUMENTS

| | | |
|---|---|---|
| 0190558 | 8/1986 | European Pat. Off. |
| 2542211 | 9/1984 | France. |
| 2611527 | 9/1988 | France. |
| WO8605117 | 9/1986 | PCT Int'l Appl. |
| WO8806477 | 9/1988 | PCT Int'l Appl. |

OTHER PUBLICATIONS

World Patents Index, Week 7903, Derwent Publications Ltd., London, Great Britain; AN 79-04839B & JP-A-53 139 143 (Hitachi KK) Dec. 5, 1978.

*Primary Examiner*—Frank Sever
*Attorney, Agent, or Firm*—Sughrue, Mion, Zinn, Macpeak & Seas

[57] ABSTRACT

A membrane for a filter device or a device for gas or liquid separation, the membrane being constituted by a porous structure made of at least one material selected from sintered ceramic, sintered metals, microporous carbon, microporous glass, and polymers, said structure including at least one microporous layer, wherein the entire outside surface and inside surface of the pores of said structure is covered by a thin and continuous film of a polyphosphazene, the thickness of said film lying in the range 0.01% to 10% of the mean diameter of the pores of said microporous layer.

20 Claims, 1 Drawing Sheet

FILTER MEMBRANE AND METHOD OF MANUFACTURE

The present invention relates to a membrane for a filter device or for a gas or liquid separator device.

BACKGROUND OF THE INVENTION

The term "membrane" is used to designate a porous structure having a surface layer in which the diameter of the pores is well-defined and determines the separating power of the membrane. Such a membrane is frequently formed by means of a macroporous support having one or more microporous layers superposed thereon.

The membrane may be constituted by a sintered ceramic (with or without the help of a vitreous phase), of microporous carbon, of sintered metal, of microporous glass, or of an organic polymer.

For a membrane constituted by a plurality of superposed layers, it is generally the surface layer that has the smallest-diameter pores and that must provide the filtering function.

It has been observed that the operating performance of such membranes depends not only on the pore diameter in its surface layer, but also on chemical or physicochemical interactions between the surfaces of the pores and the fluids to be filtered. It is therefore essential to adapt the nature of said surfaces to the fluid under consideration.

Thus, European patent EP-0 263 468 describes a membrane constituted by a porous structure in which each grain is covered by a very thin film of (simple or complex) metal oxide. The oxide layer serves to change the surface charges of the particles constituting the membrane.

French patent FR-2 611 527 relates to inorganic membranes modified by adsorption of hydrophilic polymers on the surface of the membrane. Such modification consists in physical adsorption of the polymers and must therefore be performed before the membrane is used for any filtering operation, and after any washing operation.

U.S. Pat. No. 4,983,566 describes surface deposition of an inorganic powder that adsorbs a monolayer of perfluoride organic acid or of a perfluoride phosphonic acid for the purpose of increasing the chemical stability of the membrane over a wide pH range.

It is also known that permeating flows are maximized when the liquid to be filtered possesses properties close to the surface properties of the pores in the membrane. Thus, for a hydrophobic liquid (such as an organic solvent), maximum flow rates are obtained with membranes that are hydrophobic. There is therefore a need to have hydrophobic membranes available, in particular in the following applications:
 filtering organic compounds (e.g. purifying or eliminating solid particles from oils or hydrocarbons); and
 filtering a fluid from which it is desired to recover a hydrophobic component (e.g. recovering oil micelles from an emulsion of oil in water) or to eliminate the hydrophilic component (e.g. eliminating water from fermenting gases).

Membranes having hydrophobic surfaces are already in existence. However, they are solely organic membranes whose characteristics do not enable them to be used under all conditions of temperature, pH, filter medium, or pressure.

An object of the present invention is to provide simply and cheaply a membrane having a surface that is irreversibly hydrophobic and that can be used without taking particular precautions.

SUMMARY OF THE INVENTION

The present invention provides a membrane for a filter device or a device for gas or liquid separation, the membrane being constituted by a porous structure made of at least one material selected from sintered ceramic, sintered metals, microporous carbon, microporous glass, and polymers, said structure including at least one microporous layer, wherein the entire outside surface and inside surface of the pores of said structure is covered by a thin and continuous film of a polyphosphazene, the thickness of said film lying in the range 0.01% to 10% of the mean diameter of the pores of said microporous layer.

The said porous structure is constituted in conventional manner by grains that are fixed to one another by "bonded" portions of their surfaces while leaving pores between one another delimited by the remaining "exposed" portions of their surfaces. Only the said "exposed" portions of the grain surfaces are covered with said thin film which is continuous from one grain to another.

In the most frequent case, said structure includes a macroporous support having a plurality of superimposed microporous layers, the surface microporous layer having the finest pores; the thickness of said film then lies in the range 0.01% to 10% of the mean diameter of the pores of said surface layer, which diameter itself lies in the range 0.02 $\mu$m to 15 $\mu$m.

Given the thinness of the film of polyphosphazene, the pore size of a membrane of the invention is substantially the same as the pore size of the said initial porous structure.

It is recalled that polyphosphazene is a polymer material whose chain is made up of alternating atoms of nitrogen and phosphorous with alternate single and double bonds. The phosphorous atom may carry two organic substituents R and R' which may be identical or different.

Such a material is extremely stable with respect to temperature (it can be used up to 300° C.). It has good chemical resistance to solvents or to acid or basic media. Finally, there exists great latitude as to the nature of the side groups, thereby enabling a great degree of flexibility in the properties of the polymer.

It is preferable to select a linear type of polyphosphazene: in other words the atoms of phosphorous and of nitrogen are linked together in the form of a chain (—N=P—N=P—N=P—N=), with each phosphorous atom carrying the two organic substituents R and R'.

Three classes of polyphosphazene can be used. They are defined by the substituents R and R' carried by the phosphorous atom. They are as follows:

Polyalkyloxyphosphazenes, where the substituents R and R' are alkyl chains linked to the phosphorous by an atom of oxygen: poly bis(trifluoro ethoxy) phosphazene and poly bis ethoxy phosphazene are examples of substances of this type, where the substituents R and R' are identical.

Polyalkylaminephosphazenes in which the substituents R and R' are alkyl chains linked to the phosphorous by atoms of nitrogen: poly bis (ethyl amine) phosphazene and poly bis(butyl amine) phosphazene are examples of this type of substance, where the substituents R and R' are identical.

Polyaryloxyphosphazenes in which the substituents R and R' are benzene rings, themselves carrying organic groups that may be identical or different, and that may be in arbitrary positions on the benzene rings. The benzene rings are linked to the phosphorous atoms by atoms of oxygen. Substituent groups for the benzene rings include, in non-limiting manner, the following groups:

hydrogen and the following radicals: methoxy; phenoxy; methyl; ethyl; propyl and isomers thereof; butyl and isomers thereof; vinyl; allyl; butenyl; trichloromethyl; and trifluoromethyl.

The present invention also provides a method of preparing a membrane as defined above, comprising the following stages:

preparing a solution of polyphosphazene using at least one solvent of said polymer;

impregnating said porous structure with said solution, thereby causing the pores of said structure to be filled with said solution; and drying substantially at ambient temperature.

The said impregnation may be performed in various different ways, e.g. by dipping in a tank containing solution, by cross-flow filtering the solution, or by dead-end filtering the solution.

The polyphosphazene may be dissolved in at least one solvent selected from:

alcohols, e.g. methanol or propanol;
cetones, e.g. acetone or methyl ethyl cetone;
esters, e.g. ethyl acetate;
ethers, e.g. tetrahydrofuran or diethyl ether; and
aromatic hydrocarbons, e.g. benzene, toluene, and xylene.

Dissolving may be performed hot or at ambient temperature depending on the polymer and the solvent, with stirring.

The said solution preferably contains 0.5% to 10% by weight of polyphosphazene, with the remainder being solvent.

In a variant of the method, a polyphosphazene is used whose structure enables it to be cross-linked. Thus, polyaryloxyphosphazene may be used including benzene rings linked to the phosphorous atoms via oxygen atoms and carrying, in addition to the above-described substituents, an unsaturated chain of the vinyl, allyl, or butenyl type. The polyphosphazene chain may thus include more than two types of side substituents.

A cross-linking agent such as a peroxide is added to the solution of polyphosphazene. The peroxides must commonly used as cross-linking agents are benzoyl peroxide, bis(tertio butylperoxy) 2,2 butane, terbutylcumyl peroxide, dimethyl 2,5 bis (ter-butylperoxy) 2,5 hexane, or isopropyl and peroxyterbutyl carbonate, said list not being exhaustive. These substances are preferably used at a concentration of less than 5% by weight relative to the polyphosphazene in the polymer solution.

The layer of polyphosphazene is installed using the method described above. After the layer has been dried, it is heated for cross-linking purposes in order to link together the polyphosphazene chains. Cross-linking conditions (time and temperature) are a function of the nature and the concentration of the peroxide.

In another variant of the method, a clean gas such as air or nitrogen (this list is not limiting) is blown through the parts prior to drying so as to accelerate drying. The gas used may be at ambient temperature or it may be slightly heated. The gas flow rate preferably lies in the range 0.05 to 30 liters per minute.

The hydrophobic nature of the membranes of the invention is specified by the "contact angle" measurement. Using the Washburn-Rideal equation, and given the geometrical characteristics of the membrane and the rheological characteristics of the test fluid, it is possible to calculate the contact angle, as described in the article published at pp. 1012-1018 of the "Journal of Ceramic Society of Japan"—International Edition, Vol. 95.

Table I below gives the order of magnitude of the contact angles (in degrees) for two reference solvents (water and n-heptane) as measured on a prior art membrane A and on a membrane B of the invention. Membrane B is constituted by membrane A on which a film of polyphosphazene was deposited using the above-described method.

TABLE I

|  | A | B |
|---|---|---|
| water | 30 to 40 | >90 |
| n-heptane | 55 to 80 | 25 to 45 |

BRIEF DESCRIPTION OF THE DRAWING

Examples of the invention are described by way of example with reference to the accompanying drawings, in which.

DETAILED DESCRIPTION

Example 1

The porous structure was a microporous tube of sintered metal having a mean pore diameter of 3 microns.

A polyphosphazene solution was prepared by dissolving, the solution containing:

10% by weight of poly bis(butyl amine) phosphazene;
45% by weight toluene; and
45% by weight xylene.

After dissolving, the solution was filtered through a nylon screen having a mesh size of 10 microns.

The porous structure was then impregnated. This was done by dead-end filtering the solution using the metal medium. The medium was then dried at 40° C. for 48 hours.

Example 2

A porous structure was used constituted by a porous carbon tube having an inside diameter of 6 mm, and covered with a porous ceramic layer having pores of a mean diameter of 100 nm.

A polyphosphazene solution was prepared by dissolving, the solution containing:

0.5% by weight poly bis(trifluoro ethoxy) phosphazene; and
99.5% by weight ethyl acetate.

After dissolving the solution was filtered through nylon cloth as in Example 1.

The porous structure was then impregnated. To do this, cross-flow filtering of the solution was performed, thereby filling the pores. The carbon tube was then dried at ambient temperature for 24 hours.

Figure 1:
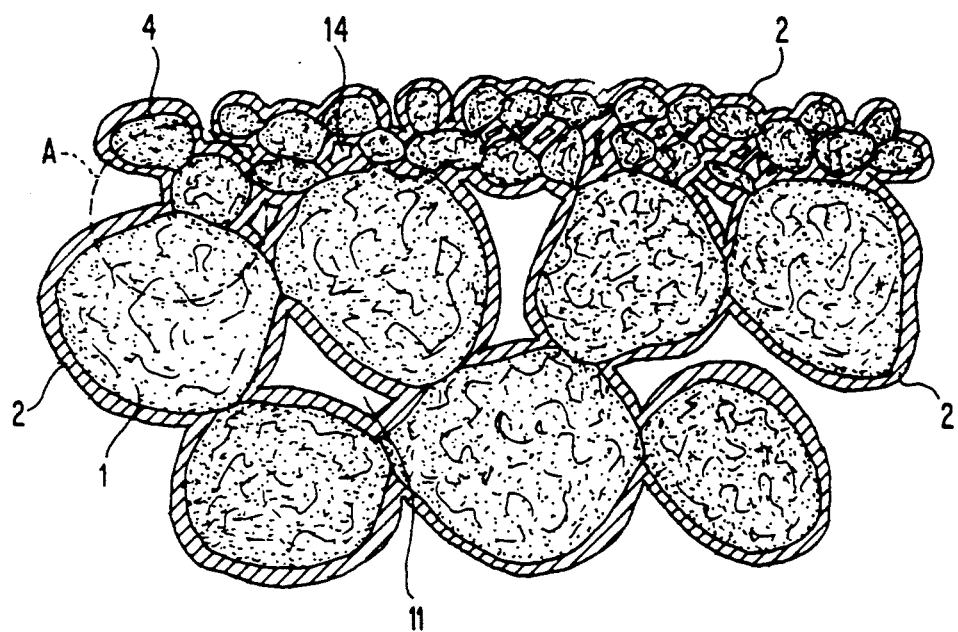
FIG. 1 is a highly diagrammatic section through a membrane of the invention.
Figure 2:
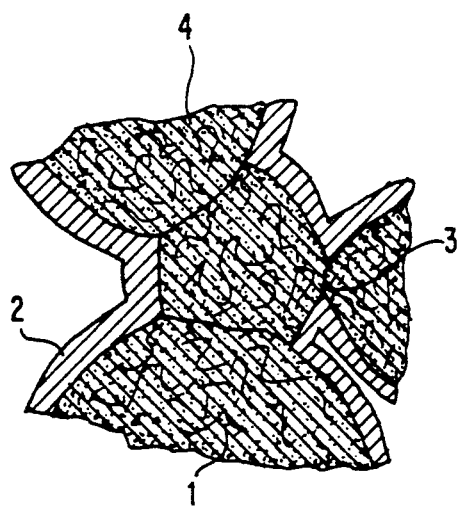
FIG. 2 is a highly diagrammatic section of a detail A from FIG. 1.

FIGS. 1 and 2 show the resulting membrane. The carbon grains are referenced 1, the ceramic grains are referenced 4, and the film of polyphosphazene is referenced 2. The grains 1 or 4 are fixed to one another by bonded portions 3 of their surfaces, leaving pores 14 and 11 between one another. The exposed portions of the surfaces of the grains are covered with the thin film 2 which is continuous from one grain to another, and which extends throughout the entire structure.

All of the films in the membranes of the following examples are analogous in appearance.

Example 3

The starting material was a porous alumina structure comprising a prismatically-shaped ceramic block pierced by 19 parallel channels having a diameter of 4 mm. The surface of each channel was covered with a layer of microporous ceramic having a mean pore diameter of 0.8 microns.

A solution of polyphosphazene was prepared by dissolving in a constant temperature bath at 60° C., the solution containing:

2% by weight of poly(p-methoxy phenoxy, s-butyl phenoxy, o-allyl phenoxy) phosphazene; and
98% by weight of methyl ethyl cetone.

The o-allyl phenoxy group represented about 10% of the groups in the polyphosphazene.

After cooling the solution, a cross-linking agent was added, namely bis(tertiobutyl peroxy) 2,2 butane, and at a concentration of 2% relative to the polyphosphazene. The solution was filtered through a nylon screen as in the preceding examples.

The macroporous block was then slowly immersed in said solution. After 60 seconds, the block was withdrawn. It was dried for 18 hours at ambient temperature. After drying, the film was cross-linked by heating for one hour at 160° C.

Example 4

A glass tube having an inside diameter of 4 mm was used as the porous structure, and its mean pore diameter was 20 nm.

A polyphosphazene solution was prepared by dissolving in a constant temperature bath at 50° C., the solution containing:

1% poly bis ethoxy phosphazene; and
99% methanol.

After cooling, the solution was filtered through a nylon screen as in the preceding examples.

The porous structure was then impregnated. This was done by cross-flow filtering the solution through the glass tube.

Deposition was stopped after 35 minutes of filtering. The glass tube was then connected at one of its ends to a compressed air circuit. The air delivered thereby was de-oiled and heated to 45° C. The other end of the tube was closed by a plug.

Air was blown through the part in this way at a rate of 30 liters per minute. This operation was continued for 2 hours in order to dry the part.

Example 5

The porous structure used was a porous ceramic tube having an inside diameter of 7 mm, and a mean pore diameter of 15 microns.

A solution of polyphosphazene was prepared by dissolving at ambient temperature, the solution containing:

5% by weight of poly(p-trifluoromethyl phenoxy, p-butenyl phenoxy) phosphazene;
94.95% by weight acetone; and
0.05% by weight dimethyl 2,5 bis(t-butyl peroxy) 2,5 hexane.

After dissolving, the solution was filtered through a nylon screen as in the preceding examples.

The macroporous block was slowly immersed in the solution so as to impregnate its porous structure. After 30 seconds, the tube was withdrawn.

One end of the tube was then connected to a cylinder of nitrogen by means of a duct including a regulator-expander, while its other end was partially closed. Nitrogen was then blown through at a flow rate of 0.05 liters per minute. This operation was continued for 3 hours.

After blowing, heating for cross-linking purposes was performed at 150° C. for 2 hours.

Example 6

A block of porous ceramic such as that described in Example 3 was used and the inside surfaces of the channels were covered in a porous ceramic layer having a mean pore diameter of 5 microns.

A solution of polyphosphazene was prepared by dissolving at ambient temperature, the solution containing:

3% by weight of poly(o-propyl phenoxy, p-phenoxy phenoxy) phosphazene;
32% by weight ethyl ether; and
65% by weight ethanol.

After dissolving, the solution was filtered through a nylon screen as in the preceding examples.

The porous structure was then impregnated by dead-end filtering the polyphosphazene solution. The ceramic block was then dried at ambient temperature for 48 hours.

Naturally, the invention is not limited to the implementations described above. Without going beyond the ambit of the invention, it is possible to replace any means by equivalent means.

We claim:

1. A membrane for a filter device or a device for gas or liquid separation, the membrane being constituted by a porous structure made of at least one material selected from sintered ceramic, sintered metals, microporous carbon, microporous glass, and polymers, said structure including at least one microporous layer, wherein the entire outside surface and inside surface of the pores of said structure is covered by a thin and continuous film of a polyphosphazene, the thickness of said film lying in the range 0.01% to 10% of the mean diameter of the pores of said microporous layer.

2. A membrane according to claim 1, wherein said structure includes a macroporous support having a plurality of superposed microporous layers, the surface microporous layer having the fineness pore size, the thickness of said film then lying in the range 0.01% to 10% of the mean diameter of the pores of said surface microporous layer, which diameter lies in the range 0.02 $\mu$m to 15 $\mu$m.

3. A membrane according to claim 1, wherein said polyphosphazene is of the linear type, i.e. its atoms of phosphorous and nitrogen form a chain, with each phosphorous atom carrying two organic substituents R and R′.

4. A membrane according to claim 3, wherein said polyphosphazene is a polyalkyloxyphosphazene, said substituents R and R' being alkyl chains linked to the phosphorous atoms by atoms of oxygen.

5. A membrane according to claim 4, wherein the said polyphosphazene is selected from poly bis(trifluoroethyoxy) phosphazene and poly bis ethoxy phosphazene.

6. A membrane according to claim 3, wherein said polyphosphazene is a polyalkylaminephosphazene, the substituents R and R' being alkyl chains linked to the phosphorous atom by atoms of nitrogen.

7. A membrane according to claim 6, wherein said polyphosphazene is selected from poly bis(ethylamine) phosphazene and poly bis(butylamine) phosphazene.

8. A membrane according to claim 3, wherein said polyphosphazene is a polyaryloxy phosphazene, said organic substituents R and R' being benzene rings themselves carrying hydrogen atoms or organic groups, said benzene rings being linked to the phosphorous atoms by atoms of oxygen.

9. A membrane according to claim 8, wherein said organic groups are selected from the following radicals: methoxy; phenoxy; methyl; ethyl; propyl and isomers thereof; butyl and isomers thereof; vinyl; allyl; butenyl; trichloromethyl; and trifluoromethyl.

10. A method of preparing a membrane for a filter device or a device for gas or liquid separation comprising forming of a porous structure of at least one material selected from the group consisting of sintered ceramic, sintered metals, microporous carbon, microporous glass, and polymers, and forming said structure to include at least one microporous layer, the improvement comprising:
preparing a solution of polyphosphazene using at least one solvent of said polymer;
impregnating said porous structure with said solution, thereby causing the pores of said structure to be filled with said solution; and
drying substantially said impregnated porous structure at ambient temperature such that the entire outside surface and inside surface of the pores of said structure is covered by a thin and continuous film of polyphosphazene with the thickness of said film lying in the range of 0.01% to 10% of the mean diameter of the pores of said at least one microporous layer.

11. A method of preparation according to claim 10, wherein said polyphosphazene solvent is selected from alcohols such as methanol and propanol.

12. A method of preparation according to claim 10, wherein said polyphosphazene solvent is selected from cetones such as acetone and methyl ethyl cetone.

13. A method of preparation according to claim 10, wherein said polyphosphazene solvent is selected from esters such as ethyl acetate.

14. A method of preparation according to claim 10, wherein said polyphosphazene solvent is selected from ethers, such as tetrahydrofuran and diethyl ether.

15. A method of preparation according to claim 10, wherein said polyphosphazene solvent is selected from aromatic hydrocarbons such as benzene, toluene, and xylene.

16. A method of preparation according to claim 10, wherein said solution contains 0.5% to 10% by weight of polyphosphazene.

17. A method of preparation according to claim 10, wherein said polyphosphazene is chosen so that its structure is capable of being cross-linked, a cross-linking agent is added to said solution to a concentration of less than 5% by weight, and said drying stage is followed by a heating operation for effecting cross-linking.

18. A method of preparation according to claim 17, wherein said polyphosphazene is a polyaryloxyphosphazene including benzene rings linked to the phosphorous atoms via atoms of oxygen, the rings themselves carrying organic groups and in addition an unsaturated chain of the vinyl, allyl, or butenyl type.

19. A method of preparation according to claim 17, wherein said cross-linking agent is a peroxide selected from: benzoyl peroxide, bis(tertio butylperoxy) 2,2 butane, terbutylcumyl peroxide, dimethyl 2,5 bis (terbutylperoxy) 2,5 hexane, and isopropyl and peroxybutyl carbonate.

20. A method of preparation according to claim 10, wherein said drying operation is preceded by an operation of blowing a gas suitable for passing through said porous structure.

* * * * *